US012705129B2

(12) United States Patent
Mavungal Noorudheen et al.

(10) Patent No.: US 12,705,129 B2
(45) **Date of Patent: *Aug. 11, 2026**

(54) PAUSING MEMORY SYSTEM BASED ON CRITICAL EVENT

(71) Applicant: Micron Technology, Inc., Boise, ID (US)

(72) Inventors: Noorshaheen Mavungal Noorudheen, Long Beach, CA (US); Sudhakar Ravindra Parab, Bengaluru (IN); Sanjay Tanaji Shinde, Bangalore (IN)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/959,406

(22) Filed: Nov. 25, 2024

(65) Prior Publication Data

US 2025/0094263 A1 Mar. 20, 2025

Related U.S. Application Data

(63) Continuation of application No. 17/941,856, filed on Sep. 9, 2022, now Pat. No. 12,189,462.

(30) Foreign Application Priority Data

Jul. 1, 2022 (IN) ............................. 202241038148

(51) Int. Cl.
*G06F 11/07* (2006.01)
*G06F 11/10* (2006.01)

(52) U.S. Cl.
CPC ........ *G06F 11/0772* (2013.01); *G06F 11/076* (2013.01); *G06F 11/1032* (2013.01)

(58) Field of Classification Search
CPC ............... G06F 11/0772; G06F 11/076; G06F 11/1032; G06F 11/0727; G06F 11/0751; G06F 11/079
USPC .......................................................... 714/34
See application file for complete search history.

(56) References Cited

U.S. PATENT DOCUMENTS 8,127,181 B1 2/2012 Shebanow et al.
10,908,987 B1 2/2021 Pandey et al.
12,189,462 B2 * 1/2025 Mavungal Noorudheen .............. G06F 11/0727
2004/0003324 A1 1/2004 Uhlig et al.
2011/0161736 A1 6/2011 Orita et al.
2014/0013187 A1 1/2014 Blaunstein
2015/0331774 A1 11/2015 Slik
2017/0139767 A1 5/2017 Cain et al.
2018/0349253 A1 12/2018 Woodward
(Continued)

*Primary Examiner* — Yair Leibovich
(74) *Attorney, Agent, or Firm* — Schwegman Lundberg & Woessner, P.A.

(57) ABSTRACT

Aspects of the present disclosure configure a system component, such as memory sub-system controller, to pause memory sub-system operations in response to a critical event. The memory sub-system controller can include a front-end (FE) device that stores critical event trigger data in trigger event logic registers. Upon detecting that operations of the memory sub-system, such as command latencies, correspond to the critical event trigger data, the FE device performs pause operations, including storing a state of the memory sub-system and transmitting an interrupt signal to the memory sub-system controller, such as a CPU, to initiate debugging operations.

20 Claims, 6 Drawing Sheets

(56) References Cited

U.S. PATENT DOCUMENTS

2024/0004745 A1 1/2024 Mavungal Noorudheen et al.
2024/0054040 A1 2/2024 Yu

* cited by examiner

FIG. 1

PAUSING MEMORY SYSTEM BASED ON CRITICAL EVENT

PRIORITY APPLICATION

This application is a continuation of U.S. application Ser. No. 17/941,856, which claims the benefit of priority to Indian Patent Application Serial Number 202241038148, filed Jul. 1, 2022, all of which are incorporated herein by reference in their entirety.

TECHNICAL FIELD

Embodiments of the disclosure relate generally to memory sub-systems and more specifically, to debugging a memory sub-system.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

FIG. 1 is a block diagram illustrating an example computing environment including a memory sub-system, in accordance with some embodiments of the present disclosure.

DETAILED DESCRIPTION

Figure 2:
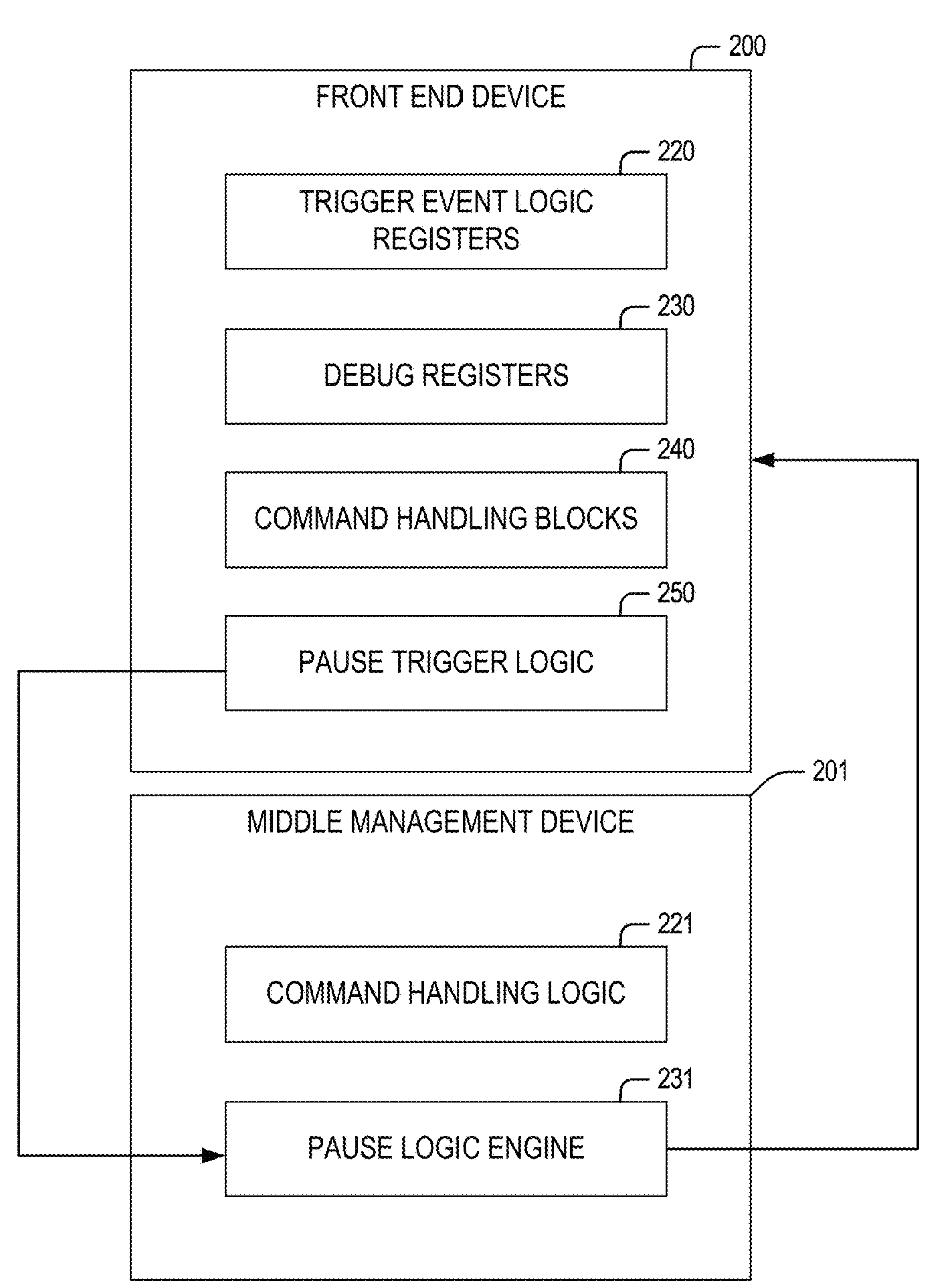
FIG. 2 is a block diagram of an example front end device and middle management logic (MML) device, in accordance with some implementations of the present disclosure.

Aspects of the present disclosure configure a system component, such as a memory sub-system controller, to debug or initiate debugging operations for a memory sub-system. The memory sub-system controller can pause memory sub-system operations in response to a critical event. The memory sub-system controller can include a front-end (FE) device that stores critical event trigger data in trigger event logic registers. Upon detecting or determining that one or more operations of the memory sub-system, such as command performance or execution latencies, correspond to the critical event trigger data, the FE device performs pause operations including storing a state of the memory sub-system and transmitting an interrupt signal to the memory sub-system controller, such as a CPU, to initiate debugging operations. In some examples, the debugging operations are initiated while the memory sub-system operates with a hardware accelerated data path.

Figure 1:
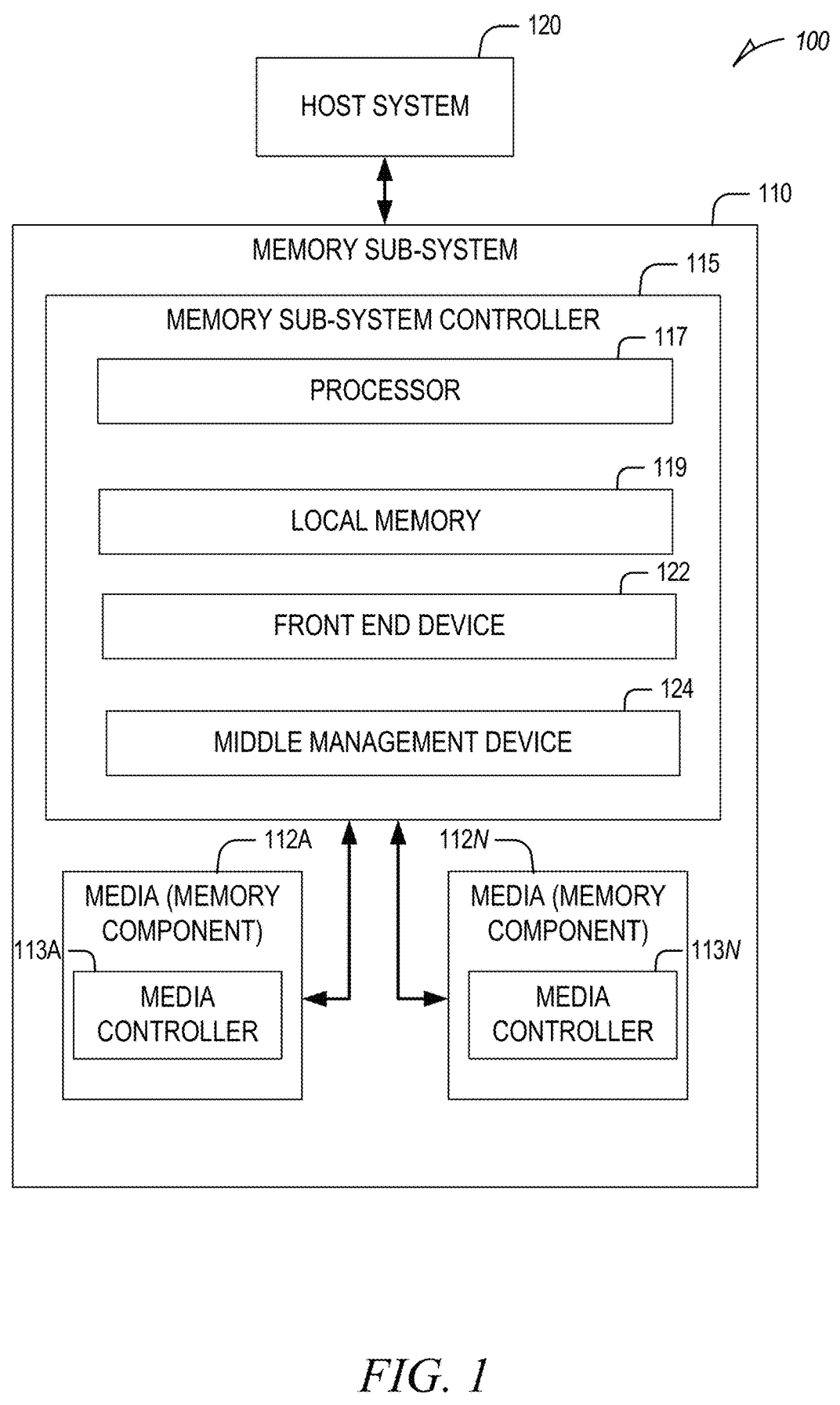

A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components, such as memory devices that store data. The host system can send access requests (e.g., write command, read command, sequential write command, sequential read command) to the memory sub-system, such as to store data at the memory sub-system and to read data from the memory sub-system. The data specified by the host is hereinafter referred to as "host data" or "user data".

A host request can include logical address information (e.g., logical block address (LBA), namespace) for the host data, which is the location the host system associates with the host data, and a particular zone in which to store or access the host data. The logical address information (e.g., LBA, namespace) can be part of metadata for the host data. Metadata can also include error handling data (e.g., ECC codeword, parity code), data version (e.g., used to distinguish age of data written), valid bitmap (which LBAs or logical transfer units contain valid data), etc.

The memory sub-system can initiate media management operations, such as a write operation, on host data that is stored on a memory device. For example, firmware of the memory sub-system may re-write previously written host data from a location on a memory device to a new location as part of garbage collection management operations. The data that is re-written, for example as initiated by the firmware, is hereinafter referred to as "garbage collection data".

"User data" can include host data and garbage collection data. "System data" hereinafter refers to data that is created and/or maintained by the memory sub-system for performing operations in response to host requests and for media management. Examples of system data include, and are not limited to, system tables (e.g., logical-to-physical address mapping table), data from logging, scratch pad data, etc.

A memory device can be a non-volatile memory device. A non-volatile memory device is a package of one or more dice. Each die can comprise one or more planes. For some types of non-volatile memory devices (e.g., NAND devices), each plane comprises a set of physical blocks. For some memory devices, blocks are the smallest area than can be erased. Each block comprises a set of pages. Each page comprises a set of memory cells, which store bits of data. The memory devices can be raw memory devices (e.g., NAND), which are managed externally, for example, by an external controller. The memory devices can be managed memory devices (e.g., managed NAND), which are raw memory devices combined with a local embedded controller for memory management within the same memory device package. The memory device can be divided into one or more zones where each zone is associated with a different set of host data or user data or application.

In some examples, the memory sub-system can operate with a hardware accelerated data path. In such implementations, firmware or processor intervention with read and write operations/commands performed by the memory sub-system are kept to a minimum. Namely, specialized hardware is implemented in the memory sub-system to reduce interaction with the processor of the memory sub-system in performing various memory operations. While such implementations improve the efficiency and speed at which memory operations can be performed, these implementations bring about challenges in debugging memory operations that arise in the process of operating the memory sub-system. Specifically, point in time debugging information can be critical to analyze the root cause and debug issues that arise during the qualification of the SSD drives or memory sub-system. Critical to performing such debugging is having access to the exact intact state of the memory sub-system while the issue is being debugged. The state can include the internal data structures, state machines, internal queue states and various other memory sub-system information. Lacking the proper tools to perform the debugging operations can make it extremely difficult to determine a root cause of issues with the memory sub-system. In case of operating the memory sub-system with an accelerated data path, timing for storing the state information of the memory sub-system is very important.

Conventional memory sub-systems instruct the memory sub-system to obtain a snapshot in combination with various logs upon detecting occurrence of an issue. For example, the memory sub-system controller can monitor progress of memory operations and once the controller detects an issue, the controller can instruct the memory sub-system to store its current state. However, in hardware accelerated data path memory sub-systems, by the time the controller detects an issue and generates an instruction to the memory sub-system to collect the state information, the memory sub-system may have already begun performing other operations, which corrupts or modifies the state of the memory sub-system when the issue arose. This makes debugging such systems nearly impossible.

Specifically, the I/O path errors can be identified by the hardware engines while the controller or firmware is completely unaware of such errors until the hardware engines communicate the errors to the firmware or controller. It is at this point that the firmware or controller instructs the memory sub-system to store its state. But at this point, the memory sub-system may have already started other operations which modify the memory state that was present at the time the I/O path errors were detected.

Aspects of the present disclosure address the above and other deficiencies by configuring a system component, such as a memory sub-system FE device of a memory sub-system, to automatically (without being instructed by the controller) store a state of the memory sub-system in response to detecting occurrence of a critical event. After storing the state, the FE device can issue an interrupt signal to the controller in order to initiate debugging operations by the controller. This allows for the point-in-time state information to be preserved when critical events (errors) arise without having to wait for a specific instruction to be received from the controller or CPU. In this way, even in situations of operating the memory sub-system with a hardware accelerated data path, errors can be identified and debugged successfully. In some cases, to avoid over triggering the initiation of debug operations, the state of the memory sub-system can be stored in response to detecting occurrence of the critical event and if the memory sub-system is currently set to the debug state. If the memory sub-system is not set to the debug state, the occurrence of the critical event can be ignored or not used to initiate debugging operations.

For instance, in some embodiments, the memory sub-system includes the FE device that receives, from a processing device (controller or host), critical event trigger data. The critical event trigger data can include at least one of: Non-Volatile Memory Express (NVMe) command timeout triggering, Cyclic Redundancy Code (CRC) Errors exceeding a CRC threshold, PCIe AXI Error events, Uncorrectable Errors (UE) events, read or write completion latencies exceeding a read or write threshold, reset event information, or memory parity errors exceeding a parity threshold. The FE device stores the critical event trigger data in one or more trigger event logic registers of the FE device and determines that one or more operations of the memory sub-system correspond to the critical event trigger data. In such cases, the FE device stores a state of the memory sub-system and transmits an interrupt signal to the processing device to initiate debugging operations, such as by or on the processing device. In some examples, the interrupt signal includes the state of the memory sub-system. In some embodiments, the state of the memory sub-system includes the status of at least one of one or more data structures, one or more queues, or one or more state machines.

In some embodiments, the FE device pauses one or more components of the memory sub-system, including the FE device, in response to determining that one or more operations of the memory sub-system correspond to the critical event trigger data. The one or more components can include an MML device and a media controller (MC). The MML device can be configured to receive commands from the FE device and transmit requests to the MC to perform the received commands. The MML device includes command identifier logic, and the FE device includes a command queue in which the commands are stored.

In some examples, the critical event trigger data includes first critical event trigger data. In such cases, the FE device stores second critical event trigger data in one or more trigger event logic registers of the FE device before the first critical event trigger data is stored. The FE device determines that a set of operations of the memory sub-system corresponds to the second critical event trigger data and transmits an indication to the processing device that a set of operations of the memory sub-system correspond to the second critical event trigger data. The processing device updates the one or more trigger event logic registers to store the first critical event trigger data in response to receiving the indication.

In some embodiments, the first critical event trigger data is computed based on a value associated with the set of operations of the memory sub-system that correspond to the second critical event trigger data. The value can represent a data transfer timeout latency that exceeds a data transfer timeout threshold value. The FE device can include one or more debug registers. The processing device can store a value to assert an output of the one or more debug registers. An output of the one or more debug registers is coupled to a first input of a NAND logic gate, and a second input of the NAND logic gate is coupled to critical event trigger signal. The critical event trigger signal can be asserted in response to determining that the one or more operations of the memory sub-system correspond to the critical event trigger data. An output of the NAND logic gate can be used to control pause logic for storing the state of the memory sub-system. In this way, the memory sub-system can operate with a hardware accelerated data path, while the one or more operations are monitored to determine whether the one or more operations correspond to the critical event trigger data.

Though various embodiments are described herein as being implemented with respect to a memory sub-system (e.g., a controller of the memory sub-system), some or all of the portions of an embodiment can be implemented with respect to a host system, such as a software application or an operating system of the host system.

FIG. 1 illustrates an example computing environment 100 including a memory sub-system 110, in accordance with some examples of the present disclosure. The memory sub-system 110 can include media, such as memory components 112A to 112N (also hereinafter referred to as "memory devices"). The memory components 112A to 112N can be volatile memory devices, non-volatile memory devices, or a combination of such. In some embodiments, the memory sub-system 110 is a storage system. A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to a memory system. The memory system can include one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and to read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, embedded computer (e.g., one included in a vehicle, industrial equipment, or a networked commercial device), or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, a universal serial bus (USB) interface, a Fibre Channel interface, a Serial Attached SCSI (SAS) interface, etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals (e.g., download and commit firmware commands/requests) between the memory sub-system 110 and the host system 120.

The memory components 112A to 112N can include any combination of the different types of non-volatile memory components and/or volatile memory components. An example of non-volatile memory components includes a negative-and (NAND)-type flash memory. Each of the memory components 112A to 112N can include one or more arrays of memory cells such as single-level cells (SLCs) or multi-level cells (MLCs) (e.g., TLCs or QLCs). In some embodiments, a particular memory component 112 can include both an SLC portion and an MLC portion of memory cells. Each of the memory cells can store one or more bits of data (e.g., blocks) used by the host system 120. Although non-volatile memory components such as NAND-type flash memory are described, the memory components 112A to 112N can be based on any other type of memory, such as a volatile memory.

In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magnetoresistive random access memory (MRAM), negative-or (NOR) flash memory, electrically erasable programmable read-only memory (EEPROM), and a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased. Furthermore, the memory cells of the memory components 112A to 112N can be grouped as memory pages or blocks that can refer to a unit of the memory component 112 used to store data. In some examples, the memory cells of the memory components 112A to 112N can be grouped into a set of different zones of equal or unequal size used to store data for corresponding applications. In such cases, each application can store data in an associated zone of the set of different zones.

The memory sub-system controller 115 can communicate with the memory components 112A to 112N to perform operations such as reading data, writing data, or erasing data at the memory components 112A to 112N and other such operations. The memory sub-system controller 115 can include hardware such as one or more integrated circuits and/or discrete components, a buffer memory, or a combination thereof. The memory sub-system controller 115 can be a microcontroller, special-purpose logic circuitry (e.g., a field programmable gate array (FPGA), an application specific integrated circuit (ASIC), etc.), or another suitable processor. The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, and so forth. The local memory 119 can also include read-only memory (ROM) for storing microcode. While the example memory sub-system 110 in FIG. 1 has been illustrated as including the memory sub-system controller 115, in another embodiment of the present disclosure, a memory sub-system 110 may not include a memory sub-system controller 115, and can instead rely upon external control (e.g., provided by an external host, or by a processor 117 or controller separate from the memory sub-system 110).

In general, the memory sub-system controller 115 can receive commands or operations from the host system 120 and can convert the commands or operations into instructions or appropriate commands to achieve the desired access to the memory components 112A to 112N. The memory sub-system controller 115 can be responsible for other operations, based on instructions stored in firmware in an active slot or associated with an active firmware slot, such as wear leveling operations, garbage collection operations, error detection and ECC operations, decoding operations, encryption operations, caching operations, address translations between a logical block address and a physical block address that are associated with the memory components 112A to 112N, address translations between an application identifier received from the host system 120, and a corresponding zone of a set of zones of the memory components 112A to 112N. This can be used to restrict applications to reading and writing data only to/from a corresponding zone of the set of zones that is associated with the respective applications. In such cases, even though there may be free space elsewhere on the memory components 112A to 112N, a given application can only read/write data to/from the associated zone, such as by erasing data stored in the zone and writing new data to the zone. The memory sub-system controller 115 can further include host interface circuitry to communicate with the host system 120 via the physical host interface. The host interface circuitry can convert the commands received from the host system 120 into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM or other temporary storage location or device) and address circuitry (e.g., a row decoder and a column decoder) that can receive an address from the memory sub-system controller 115 and decode the address to access the memory components 112A to 112N.

In some embodiments, the memory sub-system controller 115 can include an FE (Front End) device 122 and a middle management device or logic (MML) 124. In some cases, the FE device 122 and a middle management device or logic (MML) 124 are implemented as separate hardware elements that are coupled to and not included as part of the memory sub-system controller 115 hardware. In such cases, the memory sub-system controller 115 communicates with the FE device 122 and a middle management device or logic (MML) 124 via one or more external wires. The FE device 122 and the MML 124 work together to execute commands received from the host system 120. In some examples, the FE device 122 and the MML 124 are separate devices, while in other implementations they are part of the same device or component. The FE device 122 and the MML 124 together execute instructions with minimal involvement of the processor 117 or firmware to provide a hardware accelerated data path. In such cases, the FE device 122 and the MML 124 communicate directly with the memory components 112A to 112N and include various circuitries to implement pause operations to enable the processor 117 to accurately debug the memory sub-system 110 in case a critical event, issue or failure is detected.

The memory devices can be raw memory devices (e.g., NAND), which are managed externally, for example, by an external controller (e.g., memory sub-system controller 115). The memory devices can be managed memory devices (e.g., managed NAND), which is a raw memory device combined with a local embedded controller (e.g., local media controllers) for memory management within the same memory device package. Any one of the memory components 112A to 112N can include a media controller (e.g., media controller 113A and media controller 113N) to manage the memory cells of the memory component, to communicate with the memory sub-system controller 115, and to execute memory requests (e.g., read or write) received from the memory sub-system controller 115.

According to some embodiments, the FE device 122 receives, from the host system 120 and/or the processor 117, critical event trigger data. The critical event trigger data can include logic, parameters of instructions that are used to detect issues or critical events, such as hardware failures or command execution timeouts. The critical event trigger data can include a timeout value that indicates a maximum length or duration for each command or set of commands to be executed. The critical event trigger data is stored in one or more trigger event logic registers of the FE device 122. These one or more trigger event logic registers of the FE device 122 are accessed by the during execution or performance of operations of the memory subsystem 110 and compared with the operations being performed. For example, if the one or more trigger event logic registers of the FE device store a maximum length or duration of each command or set of commands, the FE device 122 can compare a current execution time of one command or set of commands with the critical event data stored in the one or more trigger event logic registers of the FE device 122. If the current execution time exceeds the value of the critical event data, the FE device 122 determines the occurrence of a critical event.

Any one or combination of different types of events can be stored and monitored by the FE device 122. For example, the FE device 122 can monitor critical event trigger data that includes at least one of Non-Volatile Memory Express (NVMe) command timeout being triggered, Cyclic Redundancy Code (CRC) Errors exceeding a CRC threshold, PCIe AXI Error event, Uncorrectable Errors (UE) event, read or write completion latency exceeding a read or write threshold, reset event information, or memory parity errors exceeding a parity threshold.

In some examples, the FE device 122, in response to determining that the one or more operations of the memory sub-system 110 correspond to the critical event trigger data, stores a state of the memory sub-system 110 without involvement of the processor 117 or host system 120. For example, the FE device 122 can generate an instruction or command to the MML 124 to begin pause operations. The MML 124, in response to the instruction, can pause execution of any further commands by the memory sub-system 110. Also, the MML 124 can store a state of the memory sub-system 110, such as the values of various logic registers, logs, queues, and/or one or more data structures, one or more queues, or one or more state machines. The MML 124 also instructs the FE device 122 to pause operations and to provide the value of the logs and queues maintained by the FE device 122. After the state of the memory sub-system 110 is collected or stored, the FE device 122 and/or MML 124 informs the processor 117 or host system 120 about the critical event, such as by transmitting an interrupt signal to the processor 117 or host system 120 to initiate debugging operations on the processing device. The interrupt signal can include the collected state of the memory sub-system 110.

In some examples, the FE device 122 includes logic elements to prevent over triggering the pause operations. For example, the FE device 122 can allow a certain quantity of critical events to be detected or determined before informing the processor 117 or host system 120 about the critical events or before pause operations are initiated. In some cases, upon receiving indication from the FE device 122 that one or more critical events have been detected, the processor 117 or host system 120 can configure a debug logic register to output an asserted debug logic signal to initiate pause operations the next time the critical event is detected. In some cases, the processor 117 or host system 120 can also update the values of the one or more trigger event logic registers to cause the same type of critical event to be triggered with lower thresholds to increase the likelihood of a pause operation being initiated. Specifically, the one or more trigger event logic registers can be updated with a reduced maximum command timeout value so that the next time a command is executed in more time than the maximum command timeout value, the critical event is triggered and the pause is initiated. The logic elements can include a NAND logic gate and/or AND logic. The NAND or AND logic gate can assert an output if the debug logic registers output signal is asserted and if the operations of the memory sub-system 110 correspond to the values stored in the one or more trigger event logic registers.

Depending on the embodiment, the FE device 122 can comprise logic (e.g., a set of transitory or non-transitory machine instructions, such as firmware) or one or more components that causes the memory sub-system 110 (e.g., the memory sub-system controller 115) to perform operations described herein with respect to the FE device 122. The FE device 122 can comprise a tangible or non-tangible unit capable of performing operations described herein. Further details with regards to the operations of the FE device 122 and the MML 124 are described below in connection with FIGS. 2 and 3.

FIG. 2 is a block diagram of an example FE device 200 and MML 201, in accordance with some implementations of the present disclosure. As illustrated, the FE device 200 includes trigger event logic registers 220, debug registers 230, command handling blocks 240, and pause trigger logic 250. The MML 201 includes command handling logic 221 and pause logic engine 231.

In some examples, the FE device 200 receives or stores default values in the trigger event logic registers 220. The trigger event logic registers 220 can store multiple types of event triggers and are coupled to the pause trigger logic 250. The trigger event logic registers 220 are configured to receive values associated with various memory operations and to compare the values with corresponding trigger events stored in the trigger event logic registers 220. The trigger event logic registers 220 are configured to assert an output whenever any one of the triggers associated with certain memory operations are satisfied. For example, the trigger event logic registers 220 assert an output when a timeout value of a command exceeds a maximum allowable duration or timeout value for that command or command type.

In some examples, the trigger event logic registers 220 communicate with the command handling blocks 240 to obtain status of various memory operation commands. The command handling blocks 240 can provide the current execution time or duration of one or a set of commands. The command handling blocks 240 store various commands in one or more command queues. The command handling blocks 240 transmit one or more commands based on the queues to the MML 201 and specifically to the command handling logic 221 of the MML 201. In response, the command handling logic 221 updates one or more logs or queues to control execution of the commands by the media controller 113A to 113N of FIG. 1.

In some examples, the command handling logic 221 of the MML 201 and/or the command handling blocks 240 of the FE device 20 can provide the current execution time or duration of one or set of commands to the trigger event logic registers 220. Such data can then be compared by the trigger event logic registers 220 to the corresponding trigger event data to determine if the current execution time or duration of one or set of commands exceeds the maximum allowable threshold value. If so, the trigger event logic registers 220 assert a value indicating the existence of a critical event or issue.

In some examples, the trigger event logic registers 220 communicate an indication to the processor 117 of FIG. 1 and/or the host system 120 of FIG. 1, indicating that the trigger event logic registers 220 has asserted the value. The indication can inform the processor 117 and/or the host system 120 that a critical event or issue has been detected. The indication can also include an identifier of the type of trigger that has been detected. For example, the indication can specify the critical event trigger data type as including at least one of Non-Volatile Memory Express (NVMe) command timeout being triggered, Cyclic Redundancy Code (CRC) Errors exceeding a CRC threshold, PCIe AXI Error event, Uncorrectable Errors (UE) event, read or write completion latency exceeding a read or write threshold, reset event information, or memory parity errors exceeding a parity threshold.

In response to the processor 117 and/or the host system 120 receiving the indication, the processor 117 and/or the host system 120 can update or modify the values of the type of critical event trigger data that is stored in the trigger event logic registers 220 to increase a likelihood that the same type of trigger event will be detected soon. For example, the processor 117 and/or the host system 120 can reduce a threshold value or quantity stored in the trigger event logic registers 220 for a particular type of trigger (e.g., reducing the maximum allowable timeout threshold or maximum number of reset operations that are performed). The processor 117 and/or the host system 120 can also set the debug registers 230 to an asserted state to cause the debug registers 230 to output an asserted value to the pause trigger logic 250.

The trigger event logic registers 220 can receive updated data from one or more commands executed by the memory sub-system 110 of FIG. 1. The trigger event logic registers 220 compare the updated data with the modified values stored in the trigger event logic registers 220 to determine if or when a trigger event exists, such as when a critical event is detected. The trigger event logic registers 220 assert an output that is coupled to the pause trigger logic 250. The pause trigger logic 250 can output an asserted value in response to both receiving an asserted value from the debug registers 230 and an asserted value from the trigger event logic registers 220. In such cases, the pause trigger logic 250 (which can be implemented by a NAND logic gate) transmits an instruction to the pause logic engine 231.

The pause logic engine 231 can pause execution of any further commands by the memory sub-system 110. For example, the pause logic engine 231 pauses the command handling logic 221 from executing further operations and the command handling blocks 240 from executing further operations. Also, the pause logic engine 231 can store a state of the memory sub-system 110, such as the values of various logic registers, logs, queues, and/or one or more data structures, one or more queues, or one or more state machines. The pause logic engine 231 also instructs the FE device 122 to pause operations and to provide the value of the logs and queues maintained by the FE device 122. After the state of the memory sub-system 110 is collected or stored, the pause logic engine 231 informs the processor 117 or host system 120 about the critical event that triggered the pause operations (e.g., the type of trigger event that asserted the value of the trigger event logic registers 220), such as by transmitting an interrupt signal to the processor 117 or host system 120 to initiate debugging operations on the processing device. The interrupt signal can include the collected state of the memory sub-system 110.

Figure 3:
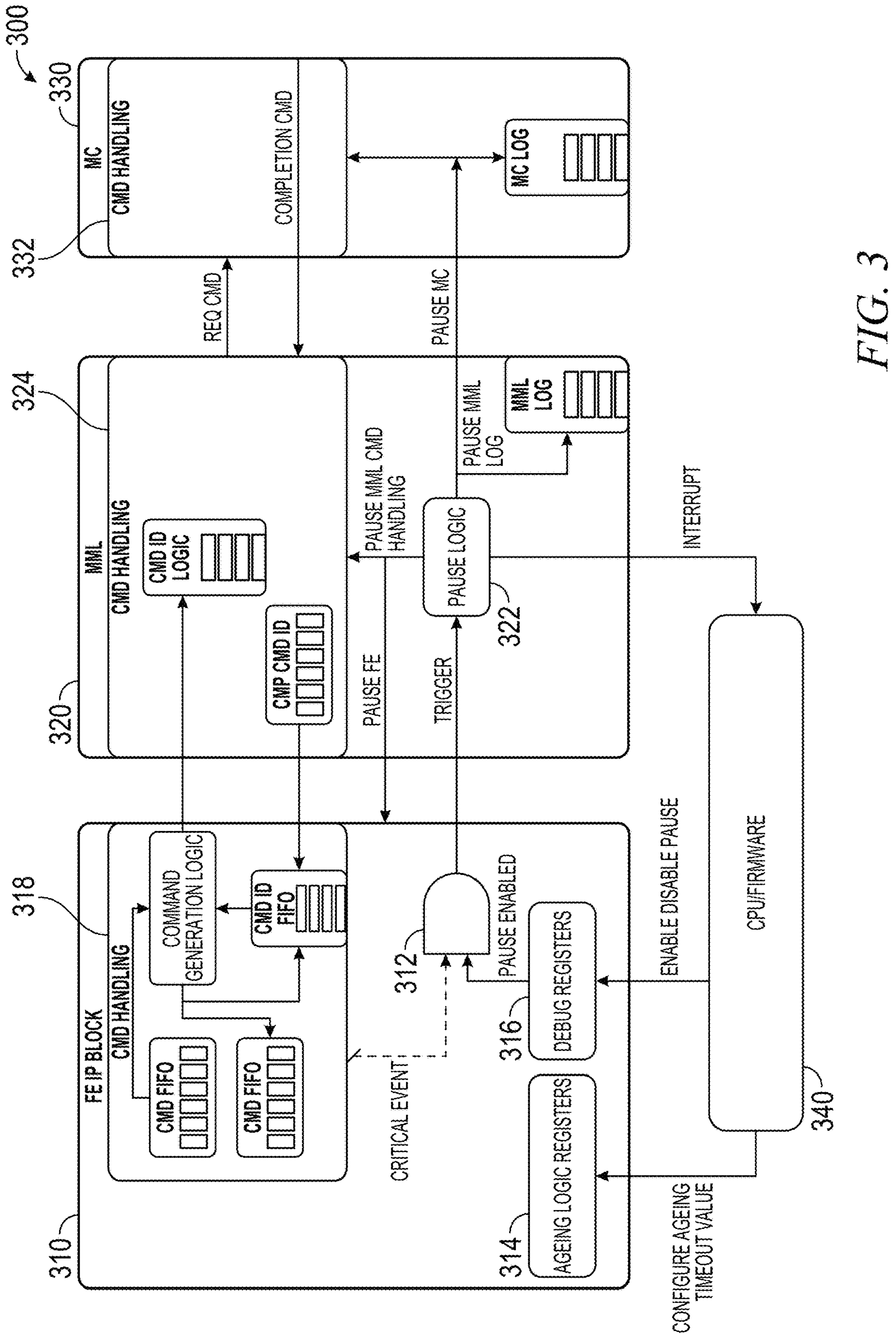
FIG. 3 is a block diagram illustrating an example memory sub-system, in accordance with some embodiments of the present disclosure.

FIG. 3 is a block diagram of an example memory sub-system 300, in accordance with some implementations of the present disclosure. As illustrated, the memory sub-system 300 includes an FE device 310, MML 320, MC 330 and CPU 340. The FE device 310 can implement the same or similar operations as FE device 200 of FIG. 2. The MML 320 can implement the same or similar operations as MML 201 of FIG. 2. The MC 330 can implement the same or similar operations as media controller 113A to 113N of FIG. 1. The CPU 340 can implement the same or similar operations as the processor 117, host system 120 and/or any other component of the memory sub-system controller 115, all of FIG. 1.

As shown in FIG. 3, the FE device 310 includes command handling components 318 which can include or perform some or all of the same operations as the command handling blocks 240 (FIG. 2). The FE device 310 also includes a logic element 312 which can implement the same or similar operations as pause trigger logic 250. For example, the command handling components 318 can output an asserted value for a critical event in response to one or more memory operations corresponding to values stored in aging logic registers 314 (which can include some or all of the same components as trigger event logic registers 220 of FIG. 2). In such cases, if the debug registers 316 (corresponding to the debug registers 230 of FIG. 2) are also asserted, the logic element 312 outputs a trigger to cause the pause logic 322 (corresponding to the pause logic engine 231 of FIG. 2) to perform one or more pause operations. The command handling block 324 includes a command handling block 324 which can perform the same operations as command handling logic 221. The command handling block 324 communicates with command handling logic 332 of the MC 330 to execute one or more memory operations or commands.

The pause logic 322 can pause execution of any further commands by the memory sub-system 110 of FIG. 1. For example, the pause logic engine 231 pauses the command handling block 324, command handling components 318, and command handling logic 332. Also, the pause logic 322 can store a state of the memory sub-system 110, such as the values of various logic registers, logs, queues, and/or one or more data structures, one or more queues, or one or more state machines. After the state of the memory sub-system 110 is collected or stored, the pause logic 322 informs the CPU 340 about the critical event that triggered the pause operations (e.g., the type of trigger event that asserted the value of the trigger event logic registers 220), such as by transmitting an interrupt signal to initiate debugging operations on the processing device.

Figure 4:
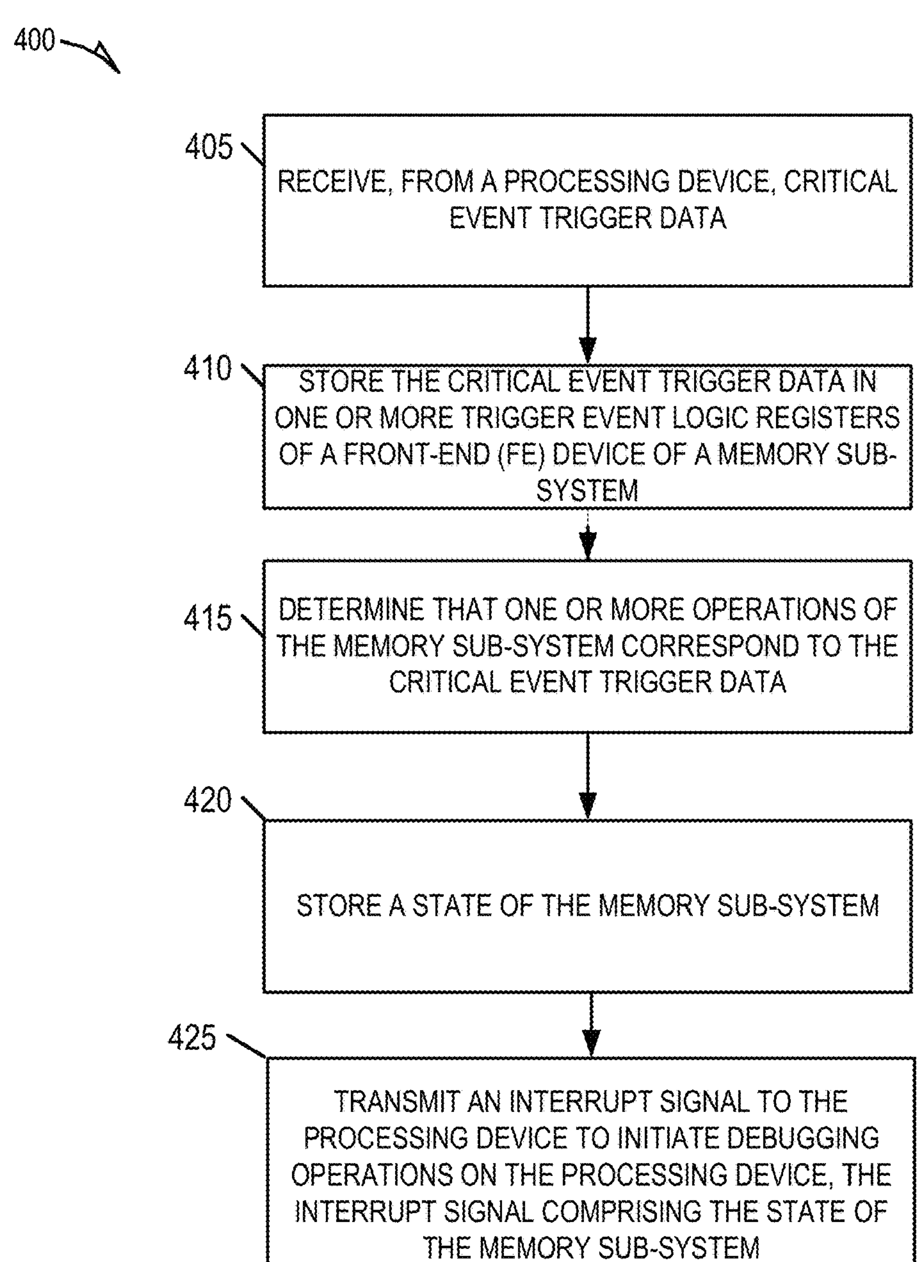
FIG. 4 is a flow diagram of example methods to perform memory sub-system debugging operations, in accordance with some implementations of the present disclosure.

FIG. 4 is a flow diagram of an example method 400 to perform debug operations, in accordance with some implementations of the present disclosure. Method 400 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 400 is performed by the memory sub-system controller 115 or subcomponents of the controller 115 of FIG. 1. In these embodiments, the method 400 can be performed, at least in part, by the FE device 122. Although the processes are shown in a particular sequence or order, unless otherwise specified, the order of the processes can be modified. Thus, the illustrated embodiments should be understood only as examples; the illustrated processes can be performed in a different order, and some processes can be performed in parallel. Additionally, one or more processes can be omitted in various embodiments. Thus, not all processes are required in every embodiment. Other process flows are possible.

Referring now to FIG. 4, the method (or process) 400 begins at operation 405, with an FE device 122 of a memory sub-system (e.g., of processor of the memory sub-system controller 115) receiving critical event trigger data from a processing device. Then, at operation 410, the FE device 122 stores the critical event trigger data in one or more trigger event logic registers and, at operation 415, determines that one or more operations of the memory sub-system correspond to the critical event trigger data stored in the one or more trigger event logic registers. At operation 420, in response to determining that one or more operations of the memory sub-system correspond to the critical event trigger data stored in the one or more trigger event logic registers, the FE device 122 stores, or causes to be stored, a state of the memory sub-system 110, and, at operation 425, transmits an interrupt signal to the processing device to initiate debugging operations on the processing device.

Figure 5:
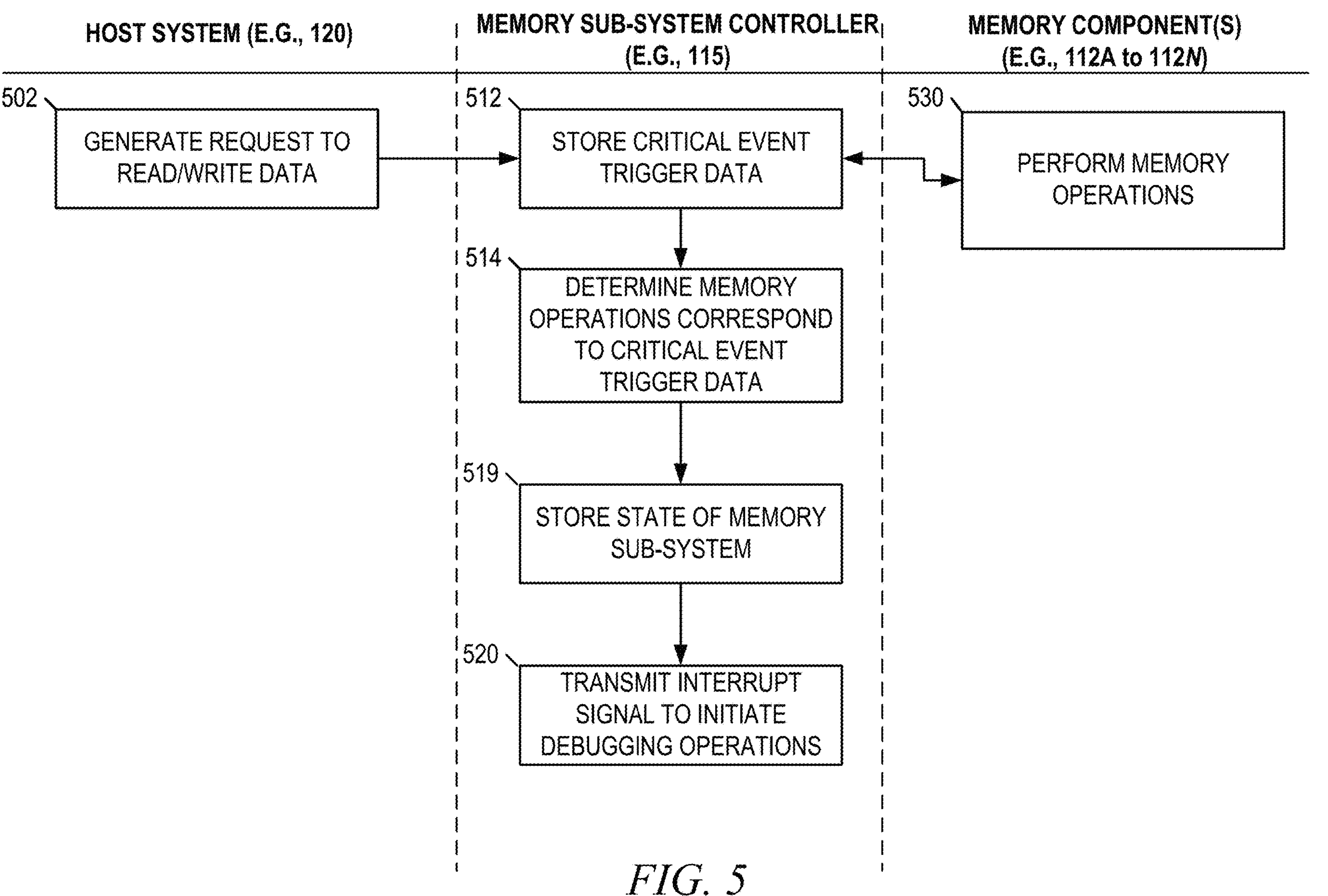
FIG. 5 provides an interaction diagram illustrating interactions between components of the computing environment in the context of some embodiments in which a method performs memory sub-system debugging operations.

FIG. 5 provides an interaction diagram illustrating interactions between components of the computing environment 100 of FIG. 1 in the context of some embodiments in which a method (or process) to perform firmware slot management. The operations of the method can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method is performed by the memory sub-system controller 115 or subcomponents of the controller 115 of FIG. 1. Although the operations are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment.

In the context of the example illustrated in FIG. 5, the host system can comprise the host system 120, the processor of the memory sub-system controller can comprise the processor 117 or FE device 122 of the memory sub-system 110 of FIG. 1, and the one or more memory components can comprise at least one of the memory components 112A to 112N of FIG. 1.

As shown in FIG. 5, at operation 502, the host system (e.g., via a processor of the host system 120) generates a request to read/write data to the memory components 112A to 112N. At operation 512, the FE device 122 stores critical event trigger data associated with the read/write data request and causes the memory components 112A to 112N to perform one or more memory sub-system 110 operations to execute commands associated with the request at operation 530.

The FE device 122 determines that one or more memory operations correspond to the stored critical event trigger data at operation 514 and, in response, at operation 519, the FE device 122 stores a state of the memory sub-system 110. At operation 520, the FE device 122 transmits an interrupt signal to the host system 120, or other processor, to initiate debugging operations.

In view of the disclosure above, various examples are set forth below. It should be noted that one or more features of an example, taken in isolation or combination, should be considered within the disclosure of this application.

Example 1: a system comprising: a memory sub-system comprising a front-end (FE) device and a set of memory components; and a processing device, operatively coupled to the FE device and the set of memory components, the FE device configured to perform operations comprising: receiving, from the processing device, critical event trigger data; storing the critical event trigger data in one or more trigger event logic registers of the FE device; determining that one or more operations of the memory sub-system correspond to the critical event trigger data; and in response to determining that the one or more operations of the memory sub-system correspond to the critical event trigger data: storing a state of the memory sub-system; and transmitting an interrupt signal to the processing device to initiate debugging operations on the processing device, the interrupt signal comprising the state of the memory sub-system.

Example 2: the system of Example 1 wherein the state of the memory sub-system includes status of at least one of one or more data structures, one or more queues, or one or more state machines.

Example 3: the system of Examples 1 or 2, wherein the critical event trigger data includes at least one of Non-Volatile Memory Express (NVMe) command timeout being triggered, Cyclic Redundancy Code (CRC) Errors exceeding a CRC threshold, PCIe AXI Error event, Uncorrectable Errors (UE) event, read or write completion latency exceeding a read or write threshold, reset event information, or memory parity errors exceeding a parity threshold.

Example 4: the system of any one of Examples 1-3, the operations comprising pausing one or more components of the memory sub-system including the FE device.

Example 5: the system of Example 4, the one or more components comprising a middle management logic (MML) device and a media controller (MC), the MML device being configured to receive commands from the FE device and transmit requests to the MC to perform the received commands.

Example 6: the system of Example 5, wherein the MML device comprises command identifier logic and the FE device comprises a command queue in which the commands are stored.

Example 7: the system of any one of Examples 1-6, wherein the critical event trigger data comprises first critical event trigger data, the operations comprising: storing second critical event trigger data in one or more trigger event logic registers of the FE device before the first critical event trigger data is stored; determining that a set of operations of the memory sub-system correspond to the second critical event trigger data; and transmitting an indication to the processing device that set of operations of the memory sub-system correspond to the second critical event trigger data, wherein the processing device updates the one or more trigger event logic registers to store the first critical event trigger data in response to receiving the indication.

Example 8: the system of Example 7, wherein the first critical event trigger data is computed based on a value associated with the set of operations of the memory sub-system that correspond to the second critical event trigger data.

Example 9: the system of Example 8, wherein the value represents a data transfer timeout latency that exceeds a data transfer timeout threshold value.

Example 10: the system of any one of Examples 7 or 8, wherein the FE device comprises one or more debug registers, and wherein the processing device stores a value to assert an output of the one or more debug registers.

Example 11: the system of Example 10, wherein an output of the one or more debug registers is coupled to a first input of a NAND logic gate, and wherein a second input of the NAND logic gate is coupled to critical event trigger signal.

Example 12: the system of Example 11, wherein the critical event trigger signal is asserted in response to determining that the one or more operations of the memory sub-system correspond to the critical event trigger data.

Example 13: the system of Example 12, wherein an output of the NAND logic gate controls pause logic for storing the state of the memory sub-system.

Example 14: the system of any one of Examples 1-13, wherein the memory sub-system operates with a hardware accelerated data path while monitoring the one or more operations to determine whether the one or more operations correspond to the critical event trigger data.

Methods and computer-readable storage medium with instructions for performing any one of the above Examples.

Figure 6:
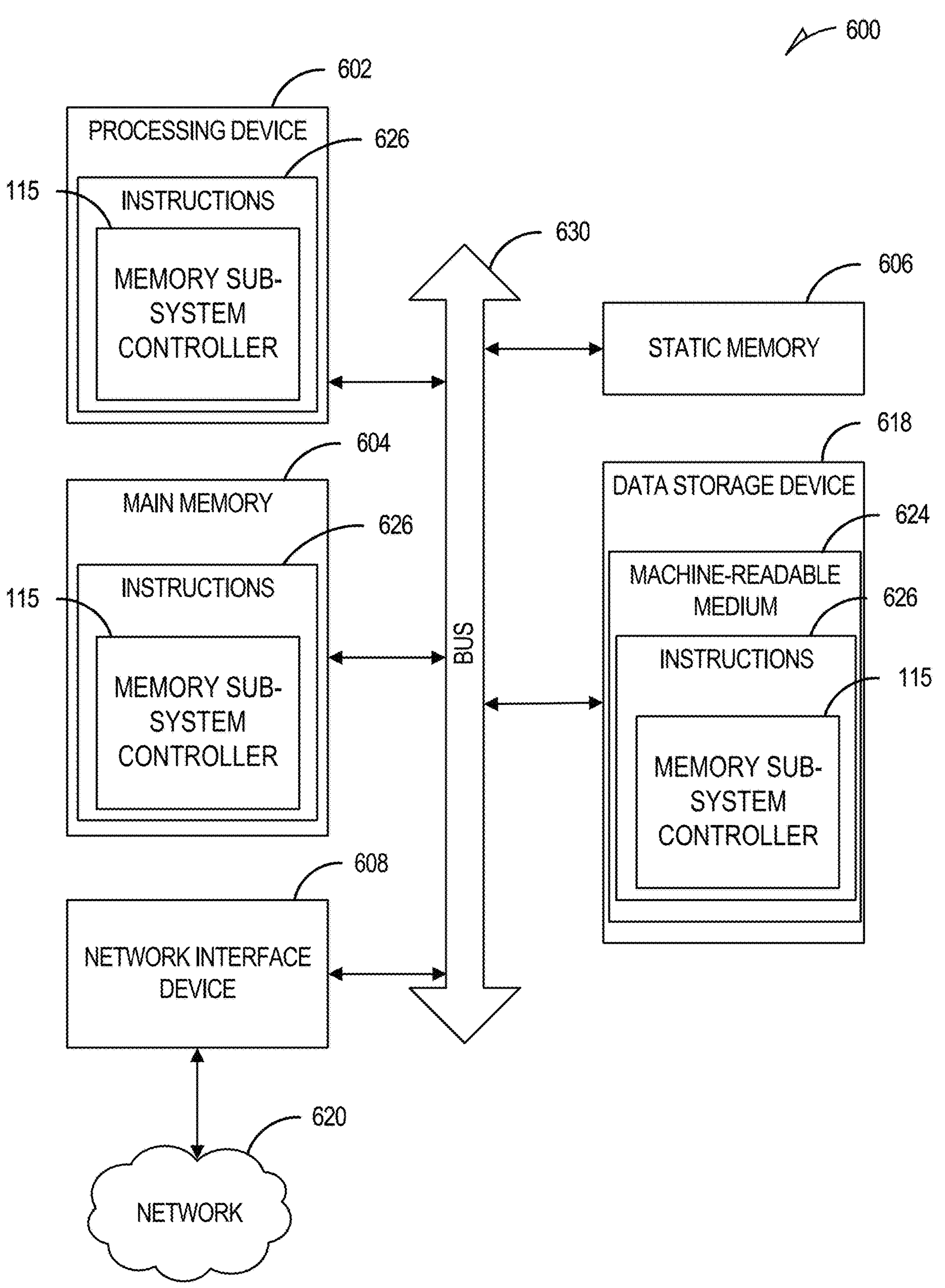
FIG. 6 is a block diagram illustrating a diagrammatic representation of a machine in the form of a computer system within which a set of instructions can be executed for causing the machine to perform any one or more of the methodologies discussed herein, in accordance with some embodiments of the present disclosure.

FIG. 6 illustrates an example machine in the form of a computer system 600 within which a set of instructions can be executed for causing the machine to perform any one or more of the methodologies discussed herein. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the FE device 122 of FIG. 1). In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a network switch, a network bridge, or any machine capable of executing a set of instructions (sequential or otherwise) that specify actions to be taken by that machine. Further, while a single machine is illustrated, the term "machine" shall also be taken to include any collection of machines that individually or jointly executes a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

The processing device 602 represents one or more general-purpose processing devices such as a microprocessor, a central processing unit, or the like. More particularly, the processing device 602 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 602 can also be one or more special-purpose processing devices such as an application specific integrated circuit (ASIC), a field programmable gate array (FPGA), a digital signal processor (DSP), a network processor, or the like. The processing device 602 is configured to execute instructions 626 for performing the operations and steps discussed herein. The computer system 600 can further include a network interface device 608 to communicate over a network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602, also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to the firmware slot manager (e.g., the FE device 122 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system's memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks; read-only memories (ROMs); random access memories (RAMs); erasable programmable read-only memories (EPROMs); EEPROMs; magnetic or optical cards; or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description above. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine-readable (e.g., computer-readable) storage medium such as a read-only memory (ROM), random access memory (RAM), magnetic disk storage media, optical storage media, flash memory components, and so forth.

In the foregoing specification, embodiments of the disclosure have been described with reference to specific example embodiments thereof. It will be evident that various modifications can be made thereto without departing from the embodiments of the disclosure as set forth in the following claims. The specification and drawings are, accordingly, to be regarded in an illustrative sense rather than a restrictive sense.

What is claimed is:

1. A system comprising:

a memory sub-system comprising a front-end (FE) device and a set of memory components; and a processing device, operatively coupled to the FE device and the set of memory components, the memory sub-system comprising one or more components comprising a middle management logic (MML) device and a media controller (MC), the MML device receiving commands from the FE device and transmitting requests to the MC to perform the received commands, the MML device comprising command identifier logic and the FE device comprising a command queue in which the commands are stored, the FE device programmed to perform operations comprising:

storing trigger data in storage of the FE device;

determining that one or more operations of the memory sub-system correspond to the trigger data; and in response to determining that the one or more operations of the memory sub-system correspond to the trigger data, transmitting a signal to the processing device comprising a state of the memory sub-system.

2. The system of claim 1, wherein the state of the memory sub-system includes status of at least one of one or more data structures, one or more queues, or one or more state machines.

3. The system of claim 1, wherein the trigger data comprises critical event trigger data including at least one of: Non-Volatile Memory Express (NVMe) command timeouts being triggered, Cyclic Redundancy Code (CRC) Errors exceeding a CRC threshold, PCIe AXI Error events, Uncorrectable Errors (UE) events, read or write completion latencies exceeding a read or write threshold, reset event information, or memory parity errors exceeding a parity threshold.

4. The system of claim 1, wherein the operations comprise pausing one or more components of the memory sub-system, including the FE device.

5. The system of claim 1, wherein the FE device comprises logic elements to prevent over triggering pause operations.

6. The system of claim 1, wherein the FE device is configured to allow a threshold quantity of critical events to be detected before transmitting a notification to the processing device to initiate debugging operations.

7. The system of claim 1, wherein the trigger data comprises first trigger data, the operations comprising:

storing second trigger data in one or more event logic registers of the FE device before the first trigger data is stored;

determining that a set of operations of the memory sub-system correspond to the second trigger data; and transmitting an indication to the processing device that the set of operations of the memory sub-system correspond to the second trigger data, wherein the processing device updates the one or more event logic registers to store the first trigger data in response to receiving the indication.

8. The system of claim 7, wherein the first trigger data is computed based on a value associated with the set of operations of the memory sub-system that correspond to the second trigger data.

9. The system of claim 8, wherein the value represents a data transfer timeout latency that exceeds a data transfer timeout threshold value.

10. The system of claim 7, wherein the FE device comprises one or more debug registers, and wherein the processing device stores a value to assert an output of the one or more debug registers.

11. The system of claim 10, wherein an output of the one or more debug registers is coupled to a first input of a NAND logic gate, and wherein a second input of the NAND logic gate is coupled to an event trigger signal.

12. The system of claim 11, wherein the event trigger signal is asserted in response to determining that the one or more operations of the memory sub-system correspond to the trigger data.

13. The system of claim 12, wherein an output of the NAND logic gate controls pause logic for storing the state of the memory sub-system.

14. The system of claim 1, wherein the memory sub-system operates with a hardware accelerated data path while monitoring the one or more operations to determine whether the one or more operations correspond to the trigger data.

15. A method comprising:

storing trigger data in storage of a front-end (FE) device of a memory sub-system, the memory sub-system comprising one or more components comprising a middle management logic (MML) device and a media controller (MC), the MML device configured to receive receiving commands from the FE device and transmitting requests to the MC to perform the received commands, the MML device comprising command identifier logic and the FE device comprising a command queue in which the commands are stored;

determining that one or more operations of the memory sub-system correspond to the trigger data; and in response to determining that the one or more operations of the memory sub-system correspond to the trigger data, transmitting a signal to a processing device comprising a state of the memory sub-system.

16. The method of claim 15, wherein the processing device comprises a host coupled to the memory sub-system, and wherein the trigger data includes at least one of Non-Volatile Memory Express (NVMe) command timeouts being triggered, Cyclic Redundancy Code (CRC) Errors exceeding a CRC threshold, PCIe AXI Error events, Uncorrectable Errors (UE) events, read or write completion latencies exceeding a read or write threshold, reset event information, or memory parity errors exceeding a parity threshold.

17. The method of claim 15, further comprising pausing the one or more components of the memory sub-system including the FE device.

18. The method of claim 15, further comprising in response to receiving the signal, updating one or more values in the trigger data to cause a same type of event to be triggered with lower thresholds to increase a likelihood of a pause operation being initiated.

19. The method of claim 15, wherein the trigger data comprises first trigger data, further comprising:

storing second trigger data in one or more event logic registers of the FE device before the first trigger data is stored;

determining that a set of operations of the memory sub-system correspond to the second trigger data; and transmitting an indication to the processing device that the set of operations of the memory sub-system correspond to the second trigger data, wherein the processing device updates the one or more event logic registers to store the first trigger data in response to receiving the indication.

20. A non-transitory computer-readable storage medium comprising instructions that, when executed by a processing device, cause the processing device to perform operations comprising:

storing trigger data in storage of a front-end (FE) device of a memory sub-system, the memory sub-system comprising one or more components comprising a middle management logic (MML) device and a media controller (MC), the MML device configured to receive receiving commands from the FE device and transmitting requests to the MC to perform the received commands, the MML device comprising command identifier logic and the FE device comprising a command queue in which the commands are stored;

determining that one or more operations of the memory sub-system correspond to the trigger data; and in response to determining that the one or more operations of the memory sub-system correspond to the trigger data, transmitting a signal to the processing device comprising a state of the memory sub-system.

* * * * *